Jan. 15, 1935. L. L. CHILES ET AL 1,987,594
REVERSIBLE FRYING PAN
Filed July 21, 1933
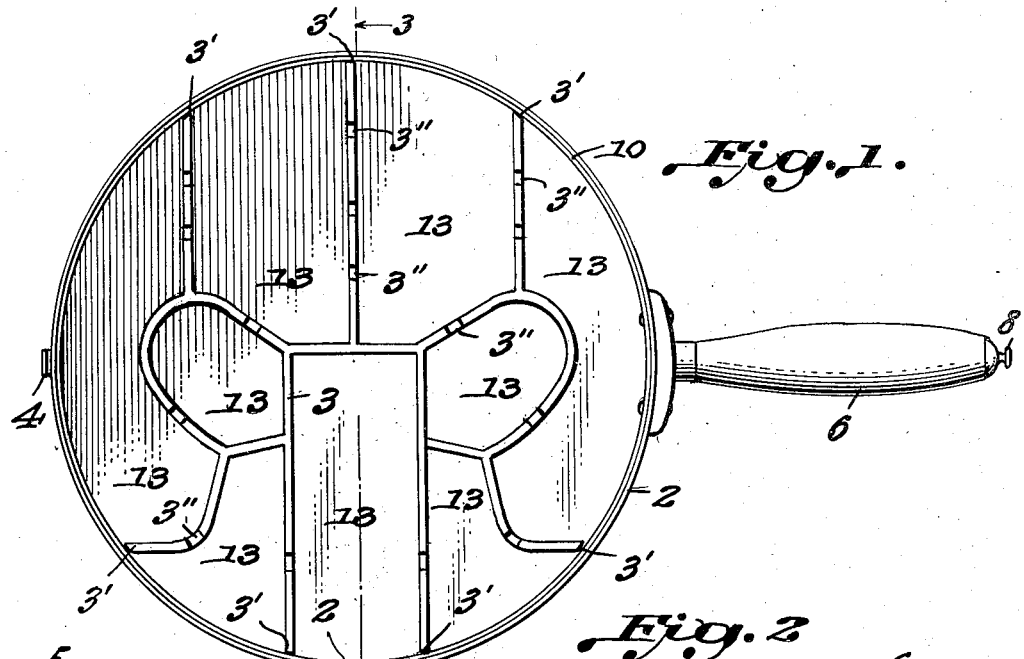
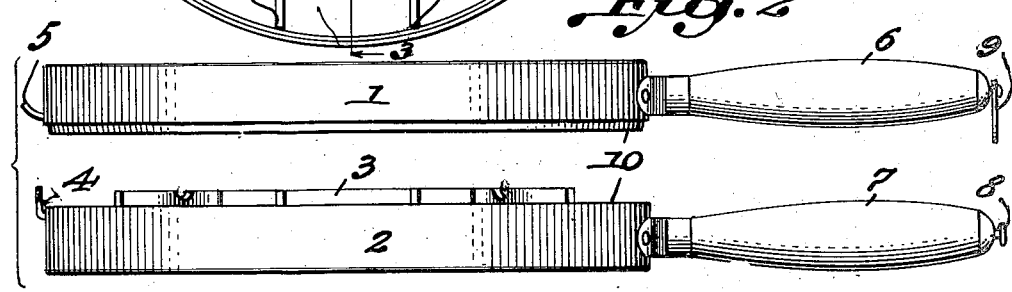
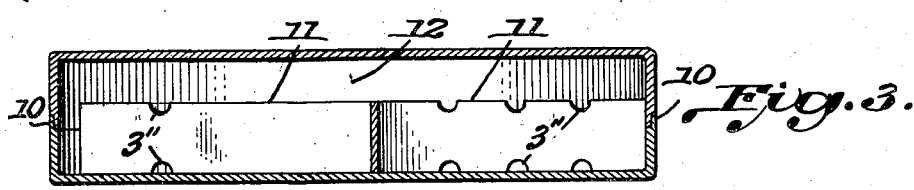
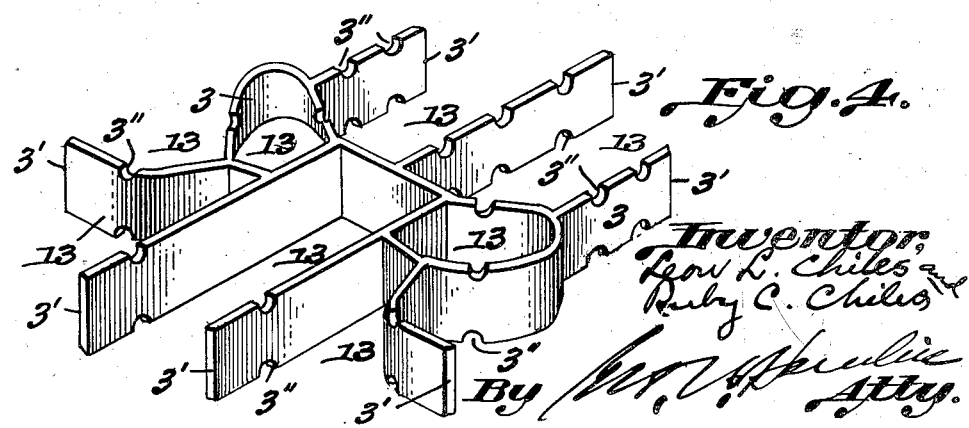

Patented Jan. 15, 1935

1,987,594

UNITED STATES PATENT OFFICE 1,987,594

REVERSIBLE FRYING PAN

Leon L. Chiles and Ruby C. Chiles, Keswick, Va.

Application July 21, 1933, Serial No. 681,648

8 Claims. (Cl. 53—7)

This invention relates to frying pans of the type having compartments and, more particularly, to those frying pans having a removable part which is subdivided into compartments.

One of the objects of our invention is the provision of a reversible frying pan of improved compartment construction and arrangement, whereby the different pieces of chicken, steak, or articles of food being fried will be retained in the same general relationship as when originally placed in the pan, when the pan is reversed after frying on one side has been accomplished.

The improved construction we have devised enables frying of both sides of the piece of chicken, steak, or other articles of food to an equal, or desired, degree without any loss of juices, cooking oil, lard, butter or grease when the pan is turned over and yet permits free flow of the juices and vapors at all times without possibility of juices, oils or the like from spattering out of the pan and onto the person using it.

Another object is the provision of an improved reversible frying pan combining two self-contained and complete frying pans and an improved cellular removable insert, constituting a three-piece construction, the parts of which are adapted for co-operation to enclose the cellular insert in the two pans to adapt the utensil for use as a unitary, complete, reversible frying pan which will hold the parts of the chicken, steak, or other articles of food in desired, separated position as aforesaid while also permitting separation of the parts to enable the two frying pans to be used independently as such, in the manner frying pans are ordinarily used.

A further object is to provide an improved cellular insert adapted for use within a frying pan or for removal therefrom to enable ready cleaning of the pan and the insert and which will be of a construction particularly adapting its compartments or cells for the reception and retention of the main parts of a chicken to the end that each may receive the heat treatment necessary to proper frying and all may be kept in separated position, thereby facilitating the frying operation, improving the flavor, and rendering readily accessible the different parts.

The improved insert co-operates with the vertical wall of the pan in an improved manner, enabling the cells or compartments to be closed at their outer ends without interfering with the ready removal of the insert when desired. The walls of the insert are preferably lower than the interior height of the two pans when closed together, thus providing an upper free space for the ready passage of steam and vapors to all of the parts or articles being fried, which tends to cause even frying of the different parts or articles undergoing heat treatment. The insert has notches or holes or depressions which enable the juices, oils, and greases to freely pass from one compartment to another for the purpose of even heat treatment.

The frying pans which house the improved insert are arranged for hinging co-operation and for connection of their handles and the pans themselves have a lap joint, thereby preventing the escape of the oil, grease, butter or other elements used in connection with frying.

The pans being disengageable, either or both may be used as an ordinary frying pan, when desired, or the insert may remain in one of the pans and the other pan entirely removed on such occasions as do not warrant the complete sealing of the frying articles or materials in the pans.

Other objects and advantages of the invention appear in the following specification. The improved and novel features and combinations residing in the invention are set forth in the appended claims.

In the accompanying drawing:

Figure 1 is a plan view showing the insert in one of the pans, the other pan having been removed;

Fig. 2 is a side elevation, showing the insert in the lower pan and the upper pan in position to be connected to the lower pan;

Fig. 3 is a cross section on the line 3—3, Fig. 1; and

Fig. 4 is a perspective view of the insert alone.

The respective substantially duplicate frying pans are shown at 1 and 2, and the insert appears at 3, the three parts comprising the complete reversible frying pan.

One of the pans is provided with a suitable keeper 4 and the other pan provided with a latch, hook or projection 5 which is adapted to detachably engage the keeper 4, the parts 4 and 5 constituting a detachable hinging connection for the pans. Each pan is provided with a suitable handle, shown at 6, 7. One of the pans has a button 8 and the other pan a swinging loop or fastener 9. When the parts 4 and 5 are hooked together and the parts 8 and 9 are enagaged, the pans 1 and 2 are securely connected. The pans having a lap joint 10, they are thereby sealed and prevent any spattering or escape of the oils, or greases or vapors. When the parts 8 and 9 are disconnected, the pan 1 may be wholly removed from pan 2, or simply raised to enable the user to inspect the condition of the articles or parts being fried and to move, shift, or test them with a fork or the like. As shown, the pans 1, 2 are circular and of the same diameter but it will be understood that they may be of other shapes, without departing from the spirit of the invention. The improved insert 3 as shown, is particularly adapted, when in the pan, to have the ends 3' of the structure abut the inner wall of the pan wherein the insert is received. This construction causes the insert, in conjunction with the wall of the pan, to define complete cells or compartments for containing the pieces of chicken, meat, or other articles of food, said cells being open at their tops, as shown at 11.

The height of the walls or parts of the insert 3 is somewhat less than the height of the interior of the duplex frying pan when the pans 1 and 2 are together, as shown in Fig. 3, and there is provided within the removable pans a free upper space 12 in which vapors, steam, etc. can circulate to have access to all of the articles or parts being fried and to spray over them the oil, grease, etc., thereby enabling substantially the same flavor to be imparted to all of the pieces being fried.

The walls or parts of the insert are provided with notches 3" in their edges which permit the free passage from one compartment or cell to another of the oil, grease, or other material used during frying and also enables the juices to circulate from one compartment to another.

The cells or compartments are designated 13 and, as shown, they have an outline particularly adapting them for reception, and separation, of the main parts of a chicken as, for instance, the legs, wings, back, giblets, etc.

So far as we are aware, we are the first to provide an insert having cells or comparements particularly designed to accommodate the principal parts of a chicken undergoing frying but we also wish it to be understood that while we lay claim to this construction of insert, we also claim the combination of a cellular or compartment-like insert differently shaped from the one illustrated to adapt it to the frying of other articles, particularly when such insert is combined with a frying pan or a duplex reversible frying pan and also wherein the ends of the walls of the insert co-operate with the walls of the pan to define the cells. When the coupled pans 1 and 2 are reversed, the insert drops onto the pan which was previously uppermost and which then becomes lowermost, without disturbing the arrangement of the parts or pieces contained within the respective cells or compartments, as they also fall.

Except where specified in the claims, we do not limit the invention to an insert which is of lesser height than the interior height of the two pans, as the invention may be constructed with an insert which is substantially of the same height as the interior height of the two pans, in which event the notches 3" will afford circulation of the oils, greases, vapors and juices from one compartment to another.

What we claim is:

1. In a reversible compound frying pan, the combination of frying pans which face, and are superposed on, each other, and a self-contained bodily removable insert therein which has individual compartments for holding different articles of food which are to be fried while said insert is located within the said pans.

2. In a reversible compound frying pan, the combination of frying pans which face, and are superposed on, each other, and a self-contained bodily removable insert therein which has individual compartments for holding different articles of food which are to be fried while said insert is located within the said pans, the height of said insert being less than the internal height of the two pans, thereby providing a free space in the frying pan which is uppermost above said insert, said insert being free to drop to the bottom of the undermost frying pan when the compound pan is reversed.

3. In a reversible compound frying pan, the combination of a pair of frying pans which face, and are superposed on, each other, and a self-contained bodily removable reversible cellular or compartment insert contained within said pair of frying pans and provided with notches in both edges of the walls of its compartments to permit flow of the juices, greases, and the like between the compartments.

4. A reversible compound frying pan comprising independent frying pans which face, and are superposed on, each other and collectively define a sealed interior space between them when closed, said pans being adapted for separation from each other, in combination with a self-contained bodily removable cellular insert adapted to be used therein.

5. A reversible compound frying pan comprising independent frying pans which face, and are superposed on, each other and collectively define a sealed interior space between them, in combination with a reversible self-contained bodily removable cellular insert adapted for use therein having notches in the edges of the walls of its cells for the passage of juices, grease, and the like between the cells thereof.

6. The combination with a frying pan, of a removable self-contained unitary compartmented insert located therein, the compartments of said insert having contours adapting them for independently holding the usual pieces or parts of a chicken or fowl which is to be fried.

7. A self-contained unitary insert for use in a cooking vessel, comprising a plurality of cells or compartments which have contours adapting them for independently holding the usual pieces or parts of a chicken or fowl which is to be fried.

8. A self-contained unitary insert for use in a cooking vessel, comprising a plurality of cells or compartments which have contours adapting them for independently holding the usual pieces or parts of a chicken or fowl which is to be fried, the edges of the walls of said insert having notches for the passage of juices, greases, and the like, and said insert being reversible.

LEON L. CHILES.
RUBY C. CHILES.